United States Patent
Saunders et al.

(10) Patent No.: US 6,519,710 B1
(45) Date of Patent: Feb. 11, 2003

(54) SYSTEM FOR ACCESSING SHARED MEMORY BY TWO PROCESSORS EXECUTING SAME SEQUENCE OF OPERATION STEPS WHEREIN ONE PROCESSOR OPERATES A SET OF TIME LATER THAN THE OTHER

(75) Inventors: Jonathan M Saunders, Coventry (GB); Robert G Strange, Nuneaton (GB); Parminder S Guraya, Coventry (GB)

(73) Assignee: Marconi Communications Limited, Coventry (GB)

( * ) Notice: Subject to any disclaimer, the term of this patent is extended or adjusted under 35 U.S.C. 154(b) by 0 days.

(21) Appl. No.: 09/373,278

(22) Filed: Aug. 12, 1999

(30) Foreign Application Priority Data

Aug. 13, 1998 (GB) .............................................. 9817598

(51) Int. Cl.[7] .......................... G06F 1/04; G06F 15/167
(52) U.S. Cl. ........................ 713/500; 713/401; 709/213
(58) Field of Search ................................ 713/400, 401, 713/500, 501, 502; 709/213, 248, 400; 711/147, 167; 714/11, 12

(56) References Cited

U.S. PATENT DOCUMENTS

| 4,154,516 | A | * | 5/1979 | Wagensonner et al. ..... 396/169 |
|---|---|---|---|---|
| 4,164,787 | A | * | 8/1979 | Aranguren ................... 711/167 |
| 4,196,470 | A | | 4/1980 | Berg |
| 4,358,823 | A | | 11/1982 | McDonald et al. |
| 4,540,898 | A | * | 9/1985 | Pumo et al. ................. 327/288 |
| 5,231,640 | A | * | 7/1993 | Hanson et al. ................ 714/53 |
| 5,452,443 | A | | 9/1995 | Oyamada et al. |
| 5,495,570 | A | * | 2/1996 | Heugel et al. ................. 714/11 |

FOREIGN PATENT DOCUMENTS

| EP | 0 729 101 A1 | 8/1996 |
|---|---|---|
| WO | 98/10348 | 3/1998 |

* cited by examiner

Primary Examiner—Thomas Lee
Assistant Examiner—Thuan Du
(74) Attorney, Agent, or Firm—Kirschstein, et al.

(57) ABSTRACT

A data processing system comprising a common memory shared by a first and second data processor circuit, in which each processor circuit executes the same sequence of operational steps and each is connected to the common memory. An isolating device connected between the first data processor circuit and the common memory restricts access by the processor circuit is arranged to execute each operational step a set time period later than the second data processor circuit. A comparator compares the output signals of the two processor circuits in order to detect faulty operation but, before the comparison, the outputs of the second processor circuit are delayed by the set time period.

19 Claims, 2 Drawing Sheets

SYSTEM FOR ACCESSING SHARED MEMORY BY TWO PROCESSORS EXECUTING SAME SEQUENCE OF OPERATION STEPS WHEREIN ONE PROCESSOR OPERATES A SET OF TIME LATER THAN THE OTHER

BACKGROUND OF THE INVENTION

The present invention relates to the field of digital circuits which share a common memory in general and to Lockstep arrangements in particular.

Lockstep arrangements have application in areas that demand highly reliable operation from data processing systems, which term is used here to include digital (also referred to as logic circuits) such as processor circuits. The term "Lockstep" is used here to indicate a system where two, more or less identical digital circuits are run 'in parallel' and their operation monitored (eg in order to increase reliability and to detect faulty operation). If the behaviour of one of the circuits diverges from that of the other then a fault has occurred that can be detected so allowing remedial action to be taken.

Lockstep is normally applied to circuits that are synchronised to a clock signal. Hence "in step" is used here to indicate, in synchronous circuits, events occurring within the same cycle of the clock signal.

By 'run in parallel' is meant that each circuit receives the same inputs in step and processes those inputs in step in order to generate identical outputs, also in step. In particular, the behaviour of the two digital circuits is the same every clock cycle after the assertion and de-assertion of reset, both for power up resets and for resets which stop and restart processing operation.

A Lockstep arrangement embodies Lockstep logic whose function is to keep the two digital circuits in step (or in synchronisation) and to detect any discrepancy in their behaviour, for example by comparing their outputs. If a fault is detected both circuits could be reset and a different pair of circuits, kept in reserve, initiated to take over the operation from the faulty circuits.

In the prior art, Lockstep arrangements have been applied to pairs of digital circuits, ie processor circuits, receiving identical inputs. In the Lockstep arrangements of the prior art, unless a fault occurs, in every clock cycle there is no difference in the behaviour of the devices of the two digital circuits. In every clock cycle, unless a fault occurs, the responses of the devices of the two digital circuits to every signal combination at their inputs is the same and the values at all output pins (including bidirectional pins) of the devices of the two digital circuits are the same.

In order to avoid the expense of a separate memory array for each circuit, the two digital circuits share a common memory. However whereas one circuit is able to read from and write to the common memory, the other is only able to read from it. Special circuitry is required to implement the interface to the common memory, conventionally in the form of a buffer on the read-only side. In conventional Lockstep arrangements this special circuitry is typically implemented by using fast ASIC circuitry, however these tend to be expensive and may be difficult to source.

SUMMARY OF THE INVENTION

By using the present invention it is possible to implement a Lockstep arrangement using standard commercially available components, for example, commercially available bridge devices.

The present invention provides a data processing system comprising a common memory, a first and second data processor circuit, each for executing the same sequence of operational steps and each connected to the common memory, an isolating device connected between the first data processor circuit and the common memory for restricting access to the common memory, in which the first data processor circuit is arranged to execute each operational step a set time period later than the second data processor circuit.

BRIEF DESCRIPTION OF THE DRAWINGS

Embodiments of the present invention will now be described by way of example with reference to the Figures in which.

DETAILED DESCRIPTION OF THE PREFERRED EMBODIMENTS

Figure 1:
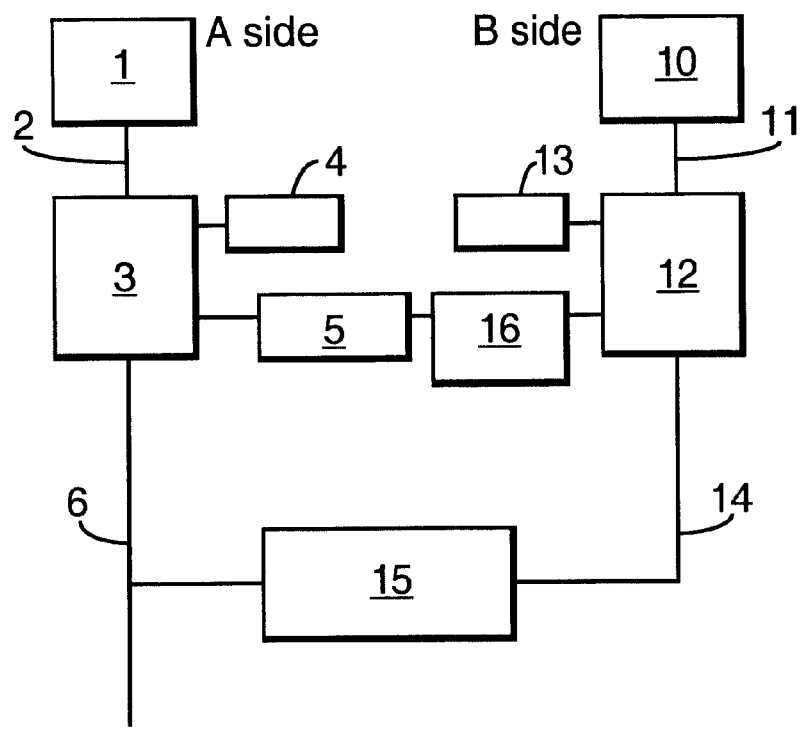
FIG. 1 shows in block diagrammatic form a Lockstep arrangement with duplicated processor circuits.

Referring to FIG. 1, we see a Lockstep arrangement applied to two processor circuits here labelled A side and B side. The A side circuit comprises a processor 1 connected to a bridge 3 via processor bus 2. Bridges 3, 12 provide interfaces between the various busses and components of the processor circuits. The processor is connected via processor bus 2 and bridge 3 to a cache memory 4, common memory 5 and to other circuitry (not shown) by peripheral bus 6. The B side processor circuit similarly comprises processor 10, processor bus 11, bridge 12, and cache memory 13. B side processor 10 accesses cache memory 13, common memory 5 and peripheral bus 14 via processor bus 11 and bridge 12. Connected between peripheral buses 6 on the A side and 14 on the B side is block 15 comprising Lockstep access control logic. Located between B side bridge 12 and common memory 5 is isolating device 16. The Lockstep logic further comprises a comparator function (not shown) to monitor the signals generated by the two processor circuits, e.g., on any or all of processor busses 2, 11, peripheral busses 6, 14 and signals to cache memories 4, 13.

The common memory 5 is readable from both A and B side processors 1, 10 via bridges 3, 12 but only writeable from the A side via bridge 3. To achieve this functionality isolating device 16 is required for the data signals between the common memory 5 and the B side bridge device 12.

The Lockstep access control logic of block 15 controls accesses to the B side peripheral bus 14, passing accesses originating from peripheral circuitry (not shown) to the B side processor circuit but stopping any access from the A side processor circuit passing to the B side. The Lockstep access control logic of block 15 also prevents access from B side peripheral bus 14 to A side peripheral bus 6.

The A side and B side processor circuits share a common processor clock that synchronises the operations of the various components, i.e. processors 1, 10, processor busses 2, 11, bridges 3, 12, cache memories 4, 13, common memory 5 and isolating device 16. According to the present embodiment of the invention, the peripheral busses 6, 14 together with the Lockstep logic of block 15 may operate at a different frequency to the processor circuitry of sides A and B, i.e. peripheral buses 6, 14 and Lockstep logic 15 share a second, peripheral clock typically slower than the processor clock. In such cases the peripheral bus interfaces of bridges 3, 12 will also be synchronised to the slower, peripheral clock. In the prior art, external signals are applied to the processor circuits of both sides in step, i.e. they are synchronised to the peripheral clock or to the processor clock.

In the following Figures some of the connections shown in FIG. 1 have been omitted for clarity.

Figure 2:
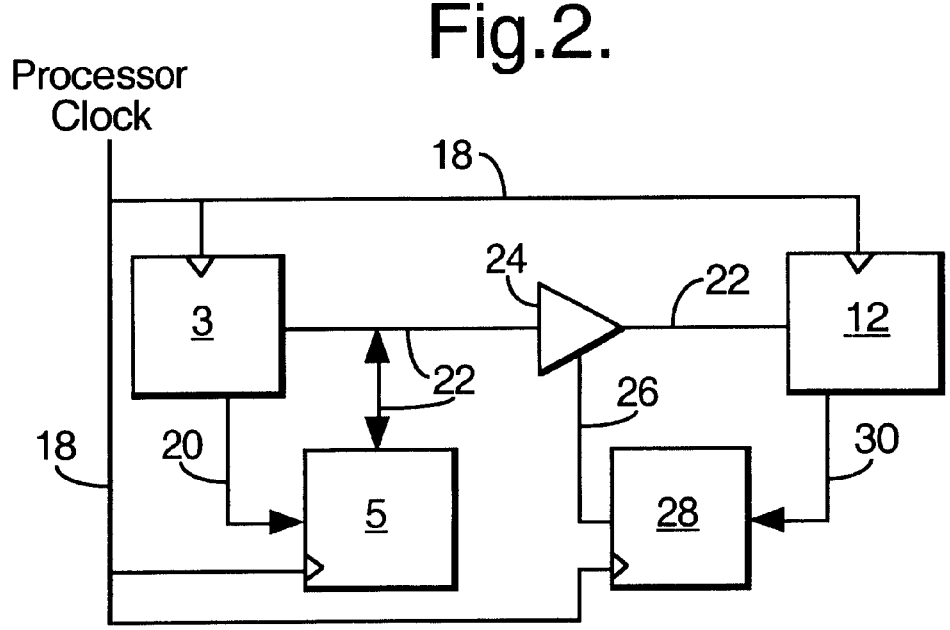
FIG. 2 shows in block diagrammatic form a simple memory buffer.

FIG. 2 shows the circuitry around common memory 5 in greater detail. A side bridge 3, B side bridge 12 and common memory 5 are all synchronised to the processor clock via clock lines 18. Address and control information is provided to common memory 5 from A side bridge 3 via address and control lines 20. Isolation device 16 of FIG. 1 comprises tri-state buffer 24 and control logic 28. Data from A side bridge 3 to common memory 5 and from common memory 5 to both A side and B side bridges 3, 12 is supplied via data lines 22 and (to the B side) via tri-state buffer 24. Tri-state buffer 24 is controlled via control lines 26 by control logic 28, also synchronised to the processor clock and itself provided with control signals from B side bridge 12 via control lines 30.

Peripheral busses 6, 14 may comprise PCI busses. By way of example the Processors 1, 10, caches 4, 12, isolation device 16 and common memory 5, may all operate at a processor bus clock rate of 100 MHz. The PCI peripheral busses and the Lockstep logic of block 15 may operate at a peripheral clock rate of 33 MHz, (to be exact 100/3 MHZ, i.e. precisely one third the processor bus clock rate and synchronous to the processor clock).

With such a high bus frequency, the performance of the common memory interface and, in particular, the timing characteristics of isolating device 16 are critical. If an additional buffer is used for isolation then the propagation delay of the buffer is added to the flight time of the data between the common memory and the B side processor circuit, therefore reducing memory bandwidth available to the A and B side circuits. For example, if the isolating device were a simple buffer as shown in FIG. 2 then the propagation delay through the buffer would prevent data reaching the B side within one 100 MHz processor bus clock cycle. This could be accommodated by reducing the clock speed to compensate, but this would result in an undesirable reduction in overall system performance.

Figure 3:
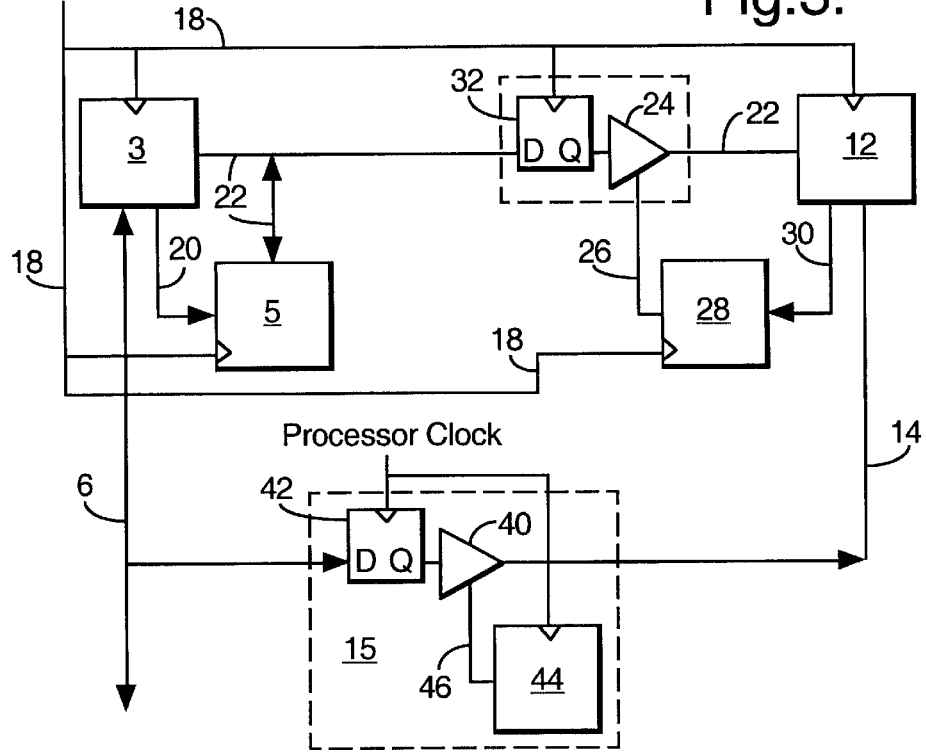
FIG. 3 shows a clocked memory buffer according to a first embodiment of the invention.

This may be avoided according to a first preferred embodiment of the present invention by the use of a delay stage (for example a clocked buffer) as shown in FIG. 3. FIG. 3 shows an arrangement similar to that of FIG. 2 and features of FIG. 3 which are equivalent to features of FIG. 2 are given the same reference numerals and will not be further described here. Unlike the arrangement of FIG. 2, the data lines 22 from common memory 5 to tri-state buffer 24 pass through a clocked buffer 32 (for example a D-type flip-flop) which is also synchronised to the processor clock via clock line 18. As indicated by the dotted line, clocked buffer 32 and tri-state buffer 24 are actually implemented as a single component, ie a tri-state clocked buffer. The clocked buffer 32 delays the data from the common memory to the B side by one processor bus clock cycle. Clocked buffer 32 is used with set-up and hold requirements determined by the timing requirements of common memory 5 and B side bridge 12. Clocked buffer 32 retimes the data but presents it at the original data rate hence the bus bandwidth of 100 MHZ (i.e. the processor clock rate) is maintained.

To compensate for data arriving late at B side bridge 12, the B side processor 10 and bridge 12 are initiated (i.e. taken out of reset) one processor bus clock cycle later than the A side. A suitable reset circuit (not shown), for example comprising a clocked buffer to delay the reset signal to the B side by one processor clock cycle, is provided for this purpose. This means that the B side does not expect the memory data until one processor clock cycle later than the A side. The result is that the A side and B side perform identical functions, albeit one processor clock cycle apart.

The result of this difference in A and B side clocking produces a Pseudo Lockstep mode. By Pseudo Lockstep is meant the devices on sides A and B receive the same inputs and react to them in an identical fashion producing identical outputs but the inputs are applied to and the outputs generated by the A and B sides a fixed number of clock cycles apart.

Thus, according to this embodiment of the invention, the prior art Lockstep logic is replaced by Pseudo Lockstep logic. The Pseudo Lockstep logic compares the data, address and control signals on the A and B sides in a similar way to the Lockstep logic of the prior art. However, prior to the comparison, the signals from the A side are delayed by the same amount as the time lag introduced by clocked buffer 32 to the inputs from common memory 5 to the B side circuit.

The Pseudo Lockstep access control logic of block 15 controls accesses to the B side peripheral bus 14, passing accesses originating from peripheral circuitry (not shown) to the B side processor circuit, but stopping any access from the side A processor circuit passing to the B side. The Pseudo Lockstep access control logic of block 15 also prevents access from B side peripheral bus 14 to A side peripheral bus 6. In addition, the Pseudo Lockstep logic of block 15 according to the invention delays inputs from the peripheral circuitry (not shown) to the B side processor circuit by the same amount as the time delay introduced by clock buffer 32 to the inputs from common memory 5 to the B side circuit.

The Pseudo Lockstep access control logic of block 15 will now be described in more detail according to the present embodiment. Isolation of B side peripheral bus 14 from A side peripheral bus 6 is achieved by buffer 40 and data from the A side peripheral bus 6 is delayed before reaching buffer 40 by passing through clocked buffer 42 which is synchronised to the processor clock signal. Access from the A side peripheral bus 6 to the B side peripheral bus 14 is controlled by control logic 44 (also synchronised to the processor clock signal) which controls operation of buffer 40 via control lines 46.

This approach, in which all inputs to the B side processor circuit must be delayed by the same amount (e.g. one processor clock), may cause problems with the interface between B side bridge 12 and the peripheral bus if running at different clock rates because it would mean, to take the example cited above, attempting to retime the 33 MHz PCI bus with a 100 MHz clock, resulting in difficult timing problems.

According to a second preferred embodiment of the present invention, the time lag introduced in data from common memory 5 to the B side is increased to 3 processor bus clock cycles, equal to one peripheral (in this case PCI bus) clock cycle. It is now necessary to delay the other inputs to B side bridge 12 by one peripheral clock cycle, which is much simpler.

Figure 4:
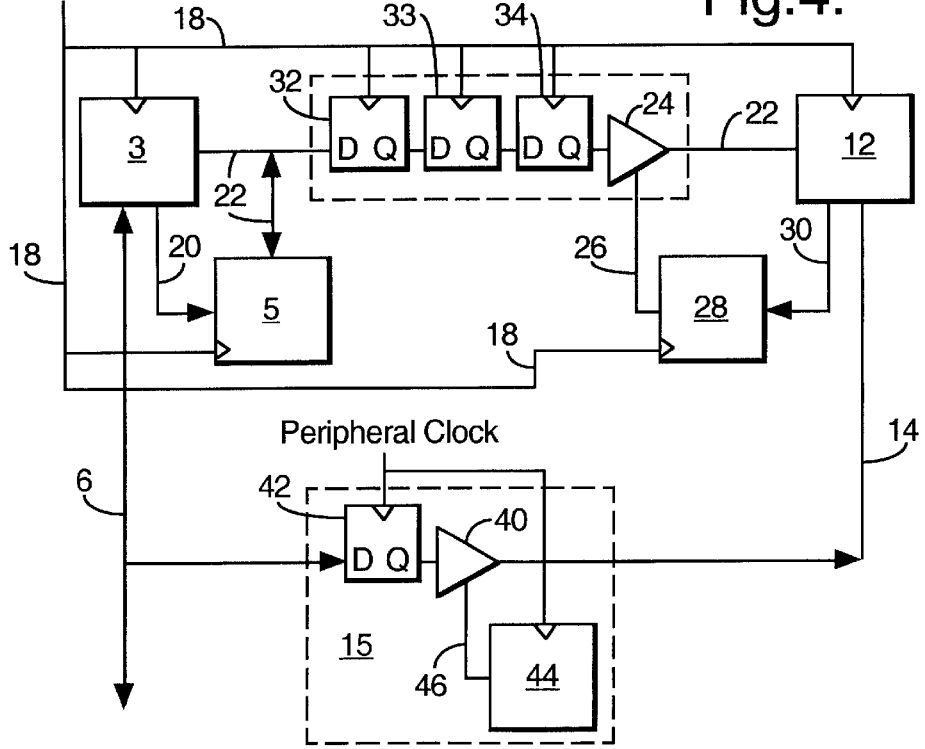
FIG. 4 shows a clocked memory buffer according to a second embodiment of the invention.

As shown in FIG. 4, the single clocked buffer 32 of FIG. 3 is replaced by a number (in this example 3) of such buffers 32–34 connected in series. As a result the data through the buffer 24 is delayed by a number of (in this example 3) processor clock cycles equivalent to one or more whole peripheral clock cycles. As in FIG. 3, the dotted line indicates that tri-state buffer 24 is implemented as part of clocked buffers 32–34, ie clocked buffer 34 and tri-state buffer 24 are implemented as a single tri-state clocked buffer. This means that data arriving at the B side bridge 12 suffers a time lag of one or more whole peripheral clock cycles compared to the data arriving at the A side bridge. Again, de-assertion of the B side reset is delayed by the amount of the time lag, and all inputs into the B side are delayed by the same amount. The Pseudo Lockstep access control logic of block 15 according to the present embodiment is essentially similar to that described above with respect to the first embodiment. Hence the features of the Pseudo Lockstep logic of FIG. 4 bear the same reference numerals as the equivalent features of FIG. 3. The important difference is that, whereas the Pseudo Lockstep logic of the first embodiment is synchronised to the processor clock signal, the Pseudo Lockstep logic of the present embodiment is synchronised to the peripheral clock signal (in this example the 33 MHZ PCI clock).

It would be obvious to the skilled worker in the field that the scope of the invention is not limited to the specific embodiments described here. For example, the present invention applies equally to other combinations of processor and peripheral clock rates. Although described here with reference to processor circuits, the invention applies equally to other sorts of digital or logic circuits, including digital signal processors. References to common memory include any read-write devices including registers and mass storage. Other forms of delay stage which may be used in implementing the invention include delay lines.

We claim:

1. A data processing system, comprising:
   a) a common memory;
   b) a first and second data processor circuit, each arranged to execute the same sequence of operational steps and each connected to the common memory;
   c) an isolating device connected between the first data processor circuit and the common memory and arranged to restrict access by the first data processor circuit to the common memory to read-only access;
   d) the first data processor circuit being arranged to execute each operational step a set time period later than the second data processor circuit;
   e) a first and second peripheral bus, the second peripheral bus being arranged to connect the second data processor circuit to further devices and arranged to connect the first data processor circuit via the first peripheral bus to the further devices; and
   f) an access controller arranged to introduce a time delay into signals passing from the further devices to the first data processor circuit.

2. The data processing system of claim 1, also comprising a comparator arranged to compare the operations of the data processor circuits in which the comparator is arranged to compensate for the time delay between the execution of each operational step by the second and the first data processor circuits when making the comparison.

3. The data processing system of claim 1, in which all inputs received by the first data processor circuit are delayed by the duration of the time period.

4. The data processing system of claim 1, in which the access controller is arranged to prevent communication between the first and the second data processor circuits via the peripheral busses and to prevent signals from the first data processor circuit passing to the further devices.

5. The data processing system of claim 1, in which the first and second data processor circuits are connected to a first clock signal for synchronization.

6. The data processing system of claim 5, in which the peripheral busses and the access controller are connected to a second clock signal for synchronization and in which, in operation, the frequency of the first clock signal is higher than the frequency of the second clock signal.

7. The data processing system of claim 6, in which the isolating device delays the data by an integral number of first clock cycles.

8. The data processing system of claim 7, in which the isolating device delays the data by an integral number of second clock cycles.

9. A data processing system, comprising:
   a) a common memory;
   b) a first and second data processor circuit, each arranged to execute the same sequence of operational steps and each connected to the common memory;
   c) an isolating device connected between the first data processor circuit and the common memory and arranged to restrict access by the first data processor circuit to the common memory to read-only access;
   d) a first and second peripheral bus, the second peripheral bus being arranged to connect the second data processor circuit to further devices and arranged to connect the first data processor circuit via the first peripheral bus to the further devices;
   e) an access controller arranged to introduce a time delay into signals passing from the further devices to the first data processor circuit; and
   f) the first data processor circuit being arranged to execute each operational step a set time period later than the second data processor circuit.

10. The data processing system of claim 9, in which the access controller is arranged to prevent communication between the first and the second data processor circuits via the peripheral busses and to prevent signals from the first data processor circuit passing to the further devices.

11. The data processing system of claim 9, in which the first and second data processor circuits are connected to a first clock signal for synchronization.

12. The data processing system of claim 11, in which the peripheral busses and the access controller are connected to a second clock signal for synchronization and in which, in operation, the frequency of the first clock signal is higher than the frequency of the second clock signal.

13. The data processing system of claim 12, in which the isolating device delays the data by an integral number of first clock cycles.

14. The data processing system of claim 13, in which the isolating device delays the data by an integral number of second clock cycles.

15. A data processing system, comprising:
   a) a common memory;
   b) a first and second data processor circuit, each arranged to execute the same sequence of operational steps and each connected to the common memory;
   c) an isolating device connected between the first data processor circuit and the common memory and arranged to restrict access by the first data processor circuit to the common memory to read-only access;

d) the first data processor circuit being arranged to execute each operational step a set time period later than the second data processor circuit;
e) the first and second data processor circuits being connected to a first clock signal for synchronization;
f) a first and second peripheral bus, the second peripheral bus being arranged to connect the second data processor circuit to further devices and arranged to connect the first data processor circuit via the first peripheral bus to the further devices; and
g) an access controller arranged to introduce a time delay into signals passing from the further devices to the first data processor circuit.

16. The data processing system of claim 15, in which the access controller is arranged to prevent communication between the first and the second data processor circuits via the peripheral busses and to prevent signals from the first data processor circuit passing to the further devices.

17. The data processing system of claim 15, in which the peripheral busses and the access controller are connected to a second clock signal for synchronization and in which, in operation, the frequency of the first clock signal is higher than the frequency of the second clock signal.

18. The data processing system of claim 17, in which the isolating device delays the data by an integral number of first clock cycles.

19. The data processing system of claim 18, in which the isolating device delays the data by an integral number of second clock cycles.

* * * * *